United States Patent
Schlipf et al.

(10) Patent No.: US 12,084,185 B2
(45) Date of Patent: Sep. 10, 2024

(54) TRACK DRIVE DEVICE FOR AN AIRCRAFT, A DRIVE ARRANGEMENT AND AN AIRCRAFT HAVING SUCH A TRACK DRIVE DEVICE

(71) Applicant: Airbus Operations GmbH, Hamburg (DE)

(72) Inventors: Bernhard Schlipf, Bremen (DE); Florian Lorenz, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/580,779

(22) Filed: Jan. 21, 2022

(65) Prior Publication Data

US 2022/0234722 A1   Jul. 28, 2022

(30) Foreign Application Priority Data

Jan. 25, 2021   (DE) .......................... 102021101508.1

(51) Int. Cl.
  *B64C 9/22* (2006.01)
  *B64C 13/34* (2006.01)
(52) U.S. Cl.
  CPC ............... *B64C 9/22* (2013.01); *B64C 13/34* (2013.01)
(58) Field of Classification Search
  CPC .... B64C 9/22; B64C 9/24; B64C 9/16; B64C 9/18; B64C 9/28; B64C 13/34
  See application file for complete search history.

(56) References Cited

U.S. PATENT DOCUMENTS

| 8,881,615 | B2 | 11/2014 | Schreiber | |
|---|---|---|---|---|
| 9,016,636 | B2 | 4/2015 | Parker | |
| 2007/0102587 | A1* | 5/2007 | Jones | B64C 9/22 244/214 |
| 2018/0135735 | A1 | 5/2018 | Brakes | |
| 2021/0316842 | A1* | 10/2021 | Walker | B64C 13/24 |

FOREIGN PATENT DOCUMENTS

| DE | 102011051514 A1 | 1/2013 | |
|---|---|---|---|
| EP | 2669191 A2 * | 12/2013 | B64C 9/14 |
| EP | 2318269 B1 | 1/2015 | |

(Continued)

OTHER PUBLICATIONS

German Search Report; priority document.
European Search Report from corresponding European application No. 2215074, completed May 16, 2022.

*Primary Examiner* — Philip J Bonzell
*Assistant Examiner* — Anna L. Gordon
(74) *Attorney, Agent, or Firm* — Greer, Burns & Crain, Ltd.

(57) ABSTRACT

In order to provide a track drive device for an aircraft that has zero backlash, a large gear reduction, the ability to self-lock, and a better load transfer and reduced wear, the track drive device drives a track member through a drive device that has at least one drive unit that is arranged adjacent to the track member. Each drive unit comprises a plurality of engaging members that are driven by a cam shaft or a cam gear such that the engaging members are sequentially shifted in a wave-like pattern which results in the track member being moved in a linear manner relative to the drive device along a longitudinal direction.

19 Claims, 15 Drawing Sheets

(56) References Cited

FOREIGN PATENT DOCUMENTS

| | | | | | |
|---|---|---|---|---|---|
| EP | 3299278 | A1 | * | 3/2018 | ............. B64C 13/28 |
| EP | 3748195 | A1 | | 12/2020 | |
| JP | 2937489 | B2 | * | 8/1999 | ............. F16H 25/08 |
| JP | 2957753 | B2 | | 10/1999 | |
| JP | 2000097304 | A | * | 4/2000 | ............. B64C 13/28 |
| RU | 2458269 | C | * | 8/2012 | |

* cited by examiner

TRACK DRIVE DEVICE FOR AN AIRCRAFT, A DRIVE ARRANGEMENT AND AN AIRCRAFT HAVING SUCH A TRACK DRIVE DEVICE

CROSS-REFERENCES TO RELATED APPLICATIONS

This application claims the benefit of the German patent application No. 102021101508.1 filed on Jan. 25, 2021, the entire disclosures of which are incorporated herein by way of reference.

FIELD OF THE INVENTION

The invention relates to a track drive device for driving a movable component of an aircraft, such as a high-lift device. The invention further relates to a drive arrangement, a wing and an aircraft.

BACKGROUND OF THE INVENTION

In aviation, numerous different linear geared drives are used to actuate or drive external and internal components of an aircraft. Those components include high-lift devices, intake ducts and their covers, control surfaces, loading ramps, cargo transporters, cargo locks and door latches as well as passenger seats.

Desirable properties for these drives include zero backlash, large gear reduction from the input to the output, ability to self-lock, better load transfer and reduced wear. For certain applications, such as the high-lift devices and control surfaces, it is desirable to have a failsafe system design.

A linear drive exhibiting at least one of these properties is known from German patent application No. 102021101487.5, whose disclosure is incorporated herein by reference.

SUMMARY OF THE INVENTION

It is an object of the invention to provide an improved linear drive device exhibiting at least one of these desired properties.

The invention provides a track drive device configured for driving a first airfoil relative to a second airfoil between a fully extended and fully retracted position, the linear track drive device comprising
a track member that extends in a longitudinal direction and includes at least one toothed rack member,
a plurality of support members that are configured to support the track member in a movable manner, and
a drive device configured for driving the track member between the fully extended and fully retracted positions, the driving device having at least one drive unit that is arranged adjacent to the track member,
wherein each drive unit comprises a plurality of engaging members being supported so as to be movable between a fully engaged position, in which the respective engaging member fully engages the toothed rack member, and a fully disengaged position, in which the respective engaging member is fully disengaged from the toothed rack member, and
a rotatable cam member having a control cam portion, the control cam portion being configured so as to, upon rotation of the cam member, sequentially move the engaging members between the fully engaged and fully disengaged positions so as to cause a linear motion of the track member relative to the drive device along the longitudinal direction.

Preferably, the drive device includes at least two drive units.

Preferably, the drive units are configured such that there is at least one engaging member in the fully engaged position in at least two drive units.

Preferably, the drive units are arranged adjacent to each other along the longitudinal direction.

Preferably, the drive units are arranged offset from each other in a direction orthogonal to the longitudinal direction.

Preferably, the rotatable cam member is configured as a cam shaft and the control cam portion is disposed on a circumferential surface of the cam shaft. Preferably, the cam shaft is configured as a massive shaft and the control cam portion is disposed on the outer circumferential surface of the cam shaft. Preferably, the cam shaft is configured as a hollow shaft and the control cam portion is disposed on the inner circumferential surface of the cam shaft.

Preferably, the cam shaft comprises a plurality of cam segments and each cam segment includes a different section of the cam portion. Preferably, the cam segments are rotationally offset in a progressive manner along the axial direction of the cam shaft, so as to generate a wave-like motion of the engaging members along the longitudinal direction.

Preferably, the rotatable cam member is configured as a gearwheel and the control cam portion is disposed on a lateral wheel surface. Preferably, the control cam portion is disposed on the gear rim of the gear wheel. Preferably, the control cam portion extends in the circumferential direction of the gear wheel and is spaced apart from the gear wheel center. Preferably, the control cam portion extends along at most three-quarters or at most half of the angular circumference of the gear wheel.

Preferably, the respective rotatable cam members are coupled to each other by a torque transmitting member. Preferably, the torque transmission member is configured as a pinion that meshes with the respective rotatable cam members. Preferably, the torque transmission member is an articulated coupling that has a spherical portion and a cavity portion, wherein the spherical portion is arranged on one of the respective cam members and the cavity portion is formed on the other of the respective cam members and the spherical portion is inserted into the cavity portion.

Preferably, the engaging members are arranged so as to form at least a first engaging member set and a second engaging member set of engaging members. Preferably, the control cam portion is configured so as to, upon rotation of the cam member, sequentially move engaging members of each engaging member set, wherein a first drive unit comprises the first engaging member set and a second drive unit comprises the second engaging member set.

Preferably, when the drive units are arranged on the same side of the track member, the control cam portion is configured such that the engaging members of each engaging member set closest to each other measured along the longitudinal direction are at a different position between the fully engaged and fully retracted positions and/or move in opposite directions.

Preferably, when the drive units are arranged on opposing sides of the track member, the control cam portion is configured such that the engaging members of each engaging member set closest to each other measured along the longitudinal direction are at the same position between the fully engaged and fully retracted positions and/or move together towards or away from the track member.

Preferably, the track member comprises a toothed rack member on two opposing sides. Preferably, the drive units are arranged on the opposing sides so that each drive unit engages the toothed rack member from the side on which the respective drive unit is arranged.

Preferably, the drive units are arranged on the same side of the track member and the drive units are arranged so that each drive unit engages the same toothed rack member from the side on which the drive units are arranged.

Preferably, the drive units are arranged outside or inside of a channel defined by the track member.

Preferably, the engaging members are configured in a linear arrangement that is aligned parallel to the longitudinal direction.

Preferably, at least one engaging member is integrally formed with a membrane member, the membrane member being deformable by the control cam portion so that the engaging members are shiftable between the fully engaged and fully disengaged positions.

Preferably, at least one engaging member has an engaging portion that is arranged to contact the toothed rack, and the engaging portion engages the toothed rack in a planar manner Preferably, the engaging portion, when viewed in a cross-section, is shaped as a triangle or an ogive.

Preferably, at least one engaging member has a cam contact portion that is arranged opposite of the engaging portion and arranged to contact the cam portion. Preferably, at least one engaging member is formed as a rectangular solid member or as a pin-like member; or wherein at least one engaging member is formed as a circular arc shaped solid member.

Preferably, each drive unit supports the cam member and/or the engaging members.

Preferably, each drive unit comprises a support member having a plurality of openings, and the engaging members are arranged in the openings so as to be slidable between the fully engaged and fully disengaged positions.

Preferably, the track member is configured in a circular arc shape.

The invention provides an airfoil arrangement comprising a first airfoil, a second airfoil and a track drive device as previously described, wherein the track member is attached to the first airfoil and the support members and the drive device are attached to the second airfoil, so that the drive device is capable to move the first airfoil between the fully extended and the fully retracted positions.

The invention provides a wing for an aircraft comprising a preferred airfoil arrangement, wherein the first airfoil is a high-lift device or a control surface and the second airfoil is a wing box or a leading edge member.

The invention provides an aircraft comprising a preferred track drive device and/or a preferred airfoil arrangement and/or a preferred wing.

The proposed linear drive has a cam shaft on the input/drive side, which is driven by some kind of power unit, e.g., an electric or hydraulic motor. The cam shaft is preferably seated in a housing and supported by bearing assemblies. The cam on the shaft is continuously located along the whole shaft in a spherical arrangement. Between the cam shaft and the rack multiple teeth are located in openings inside the housing. The teeth are movable relative to the housing.

A certain number of these teeth are pressed towards the rack by the cam. Based on the rotational position of the cam shaft different teeth are pressed down and the downwards movement of the tooth can be described by a wave. In that way the down pressed teeth drive the rack along its longitudinal axis. The minimum transmission speed from drive side to linear drive is at least one tooth of the rack per cam shaft rotation. Different transmission ratios are possible when multiple cam segments with offset phases are used. To drive the rack the drive side (preferably including the housing) and the cam shaft are preferably rigidly mounted in relation to the rack in its drive direction.

It is also possible that the proposed device has an inverted cam shaft build as hollow shaft with an internal cam that is used to press down multiple teeth. The teeth are mounted in a housing surrounding the piston. The piston is built like a rack with gear teeth. These teeth are continuously formed around the piston main axis. The internal cam geometry in the cam hollow shaft is preferably designed in a spiral form. The movement of the teeth towards the piston build a wave. In that way always a certain number of teeth are engaged and the piston is transported by the teeth in its drive direction. The cam shaft is in main axis direction rigidly connected to the housing and driven by some kind of external powered device.

The piston may also be a curved piston. The cam shaft in this case must consist of many segments correlation to the tooth positions. The segments must be coupled rotational to rotate synchronously.

While the linear drive device is subsequently described with reference to high-lift devices for the sake of brevity, it should be noted that the linear drive device may also be configured to drive other external movable components or internal movable components of an aircraft. External movable components include high-lift devices, intake ducts and their covers and control surfaces, whereas internal movable components include loading ramps, cargo transporters, cargo locks and door latches as well as passenger seats.

BRIEF DESCRIPTION OF THE DRAWINGS

Examples of the invention are subsequently described in more detail with reference to the accompanying drawings. Therein.

DETAILED DESCRIPTION OF THE PREFERRED EMBODIMENTS

Figure 1:
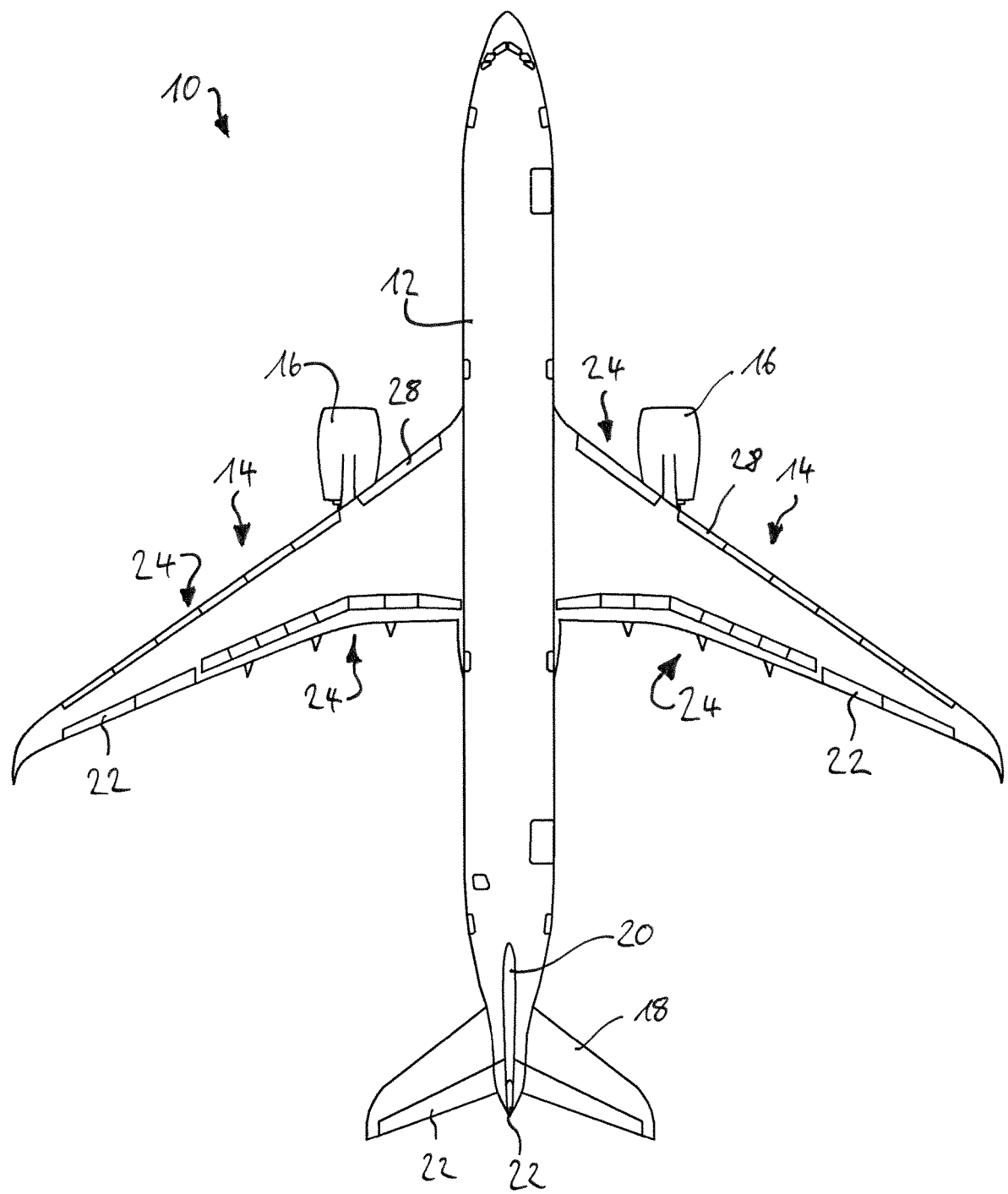
FIG. 1 depicts an embodiment of an aircraft.

Referring to FIG. 1, an exemplary embodiment of an aircraft 10 comprises a fuselage 12 to which a pair of wings 14 is attached. Further attached to the wings 14 is a pair of turbine engines 16. It should be noted that the number and type of engines may vary. At the rear of the fuselage 12 a horizontal tail plane (HTP) 18 and a vertical tail plane (VTP) 20 are arranged.

The wings 14, the HTP 18 and the VTP 20 have a plurality of control surfaces 22 for steering the aircraft 10. In addition the wings 14 also include a plurality of high-lift devices 24, such as slats and flaps.

Figure 2:
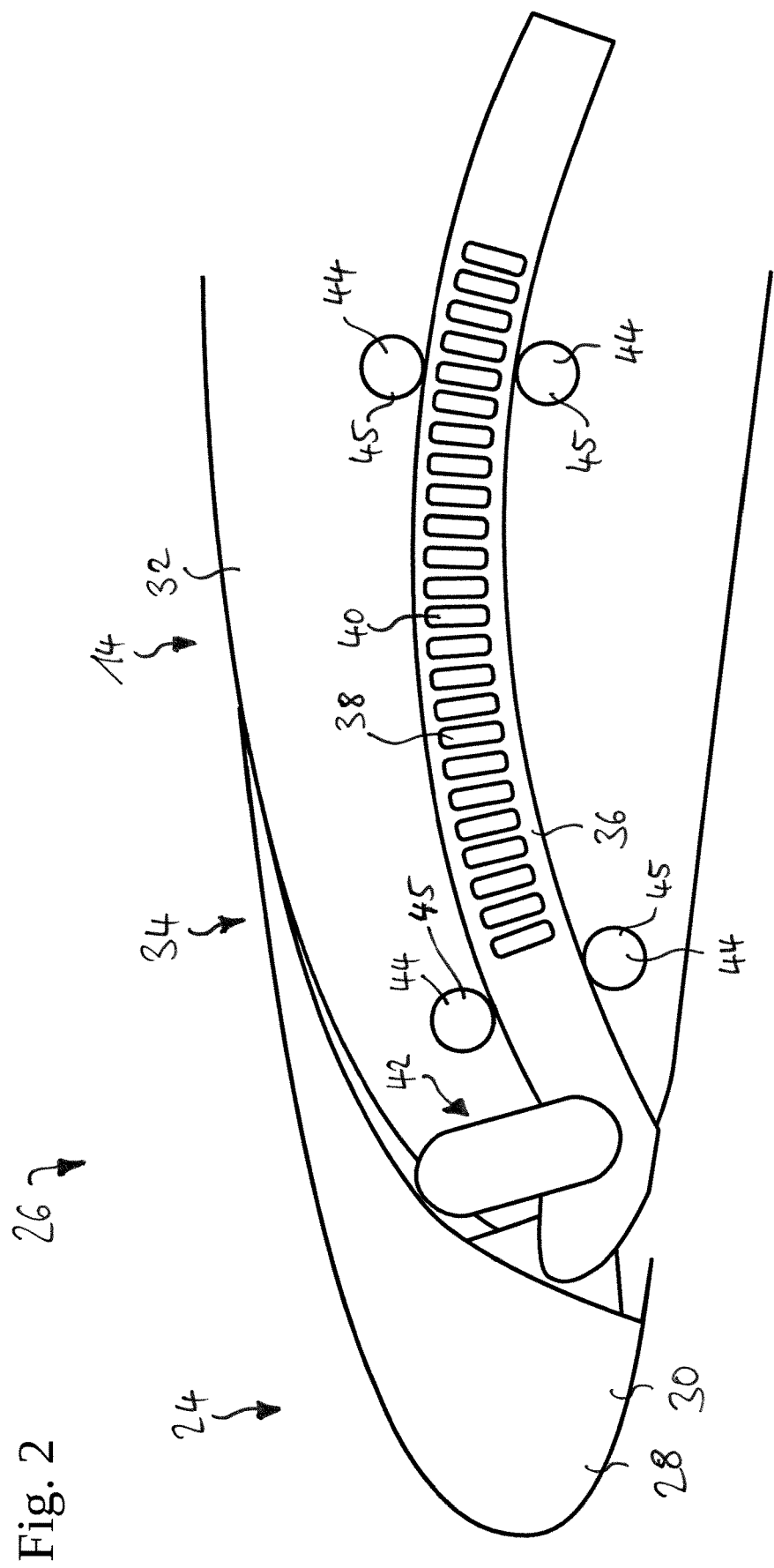
FIG. 2 depicts an embodiment of an airfoil arrangement.
Figure 3:
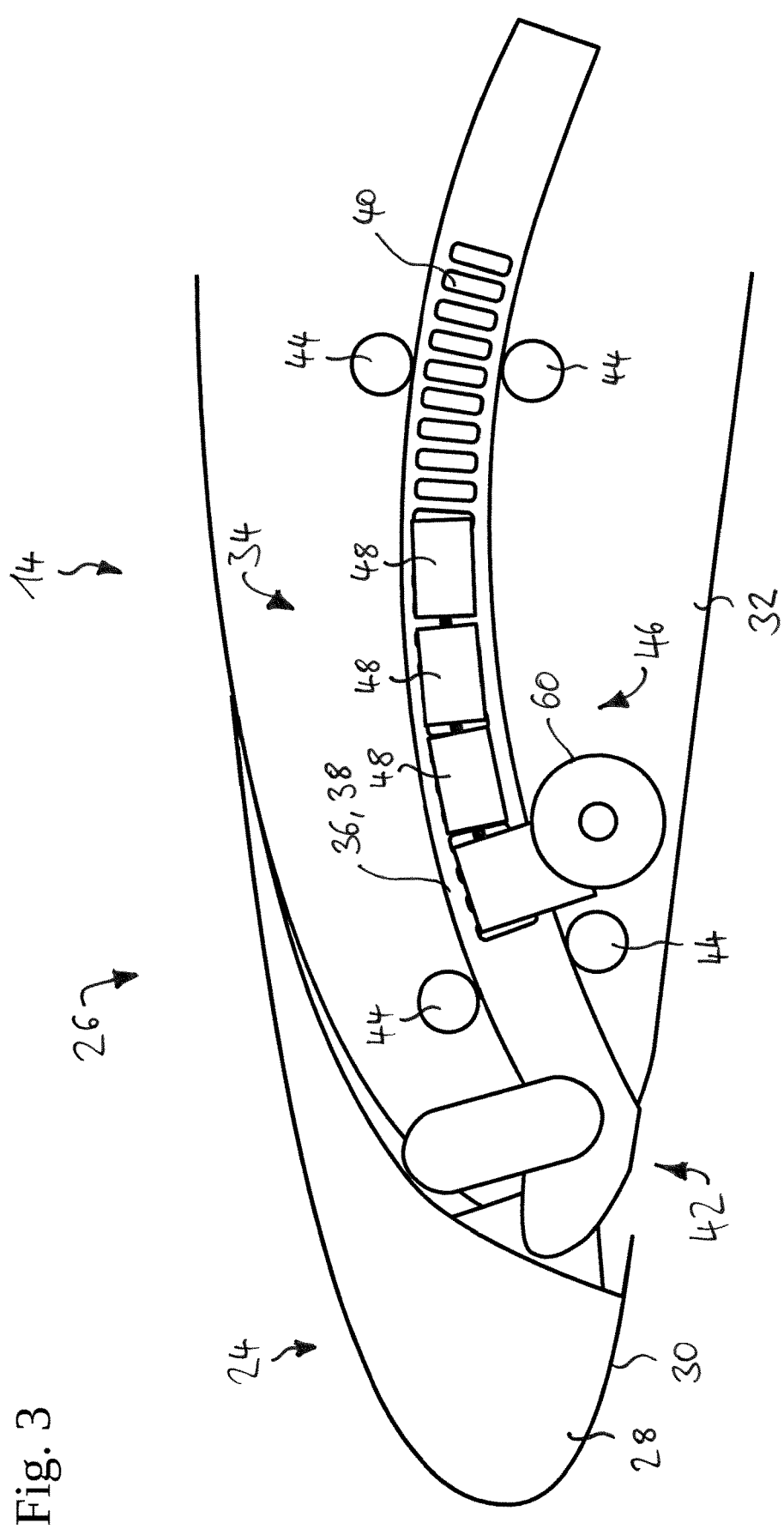
FIG. 3 depicts the airfoil arrangement of FIG. 2 in the retracted position.
Figure 4:
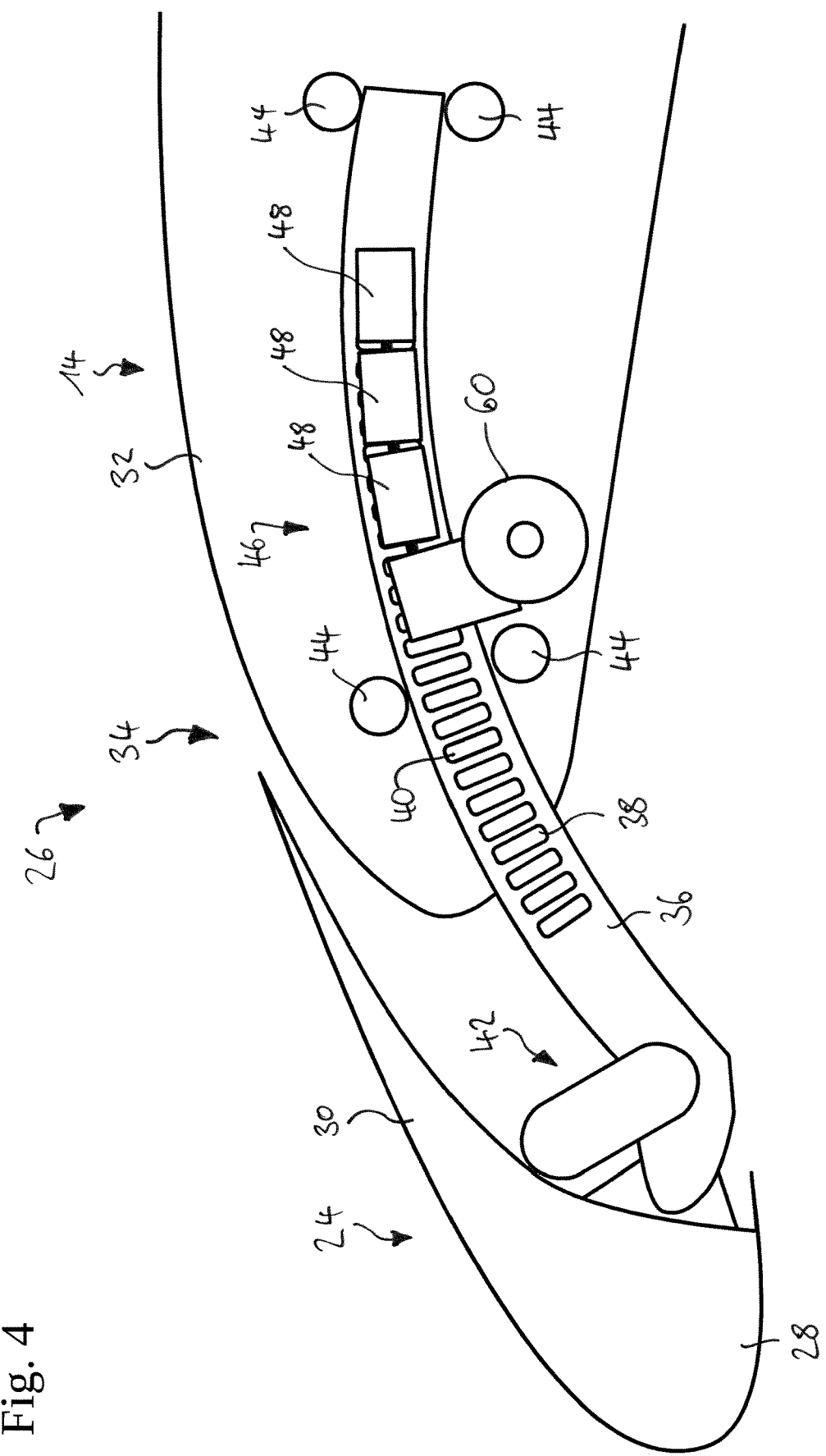
FIG. 4 depicts the airfoil arrangement of FIG. 2 in the extended position.

Referring to FIG. 2 to FIG. 4, an airfoil arrangement 26 is depicted. The airfoil arrangement 26 includes a slat 28 as a first airfoil 30 and a wing box or a leading edge member of the wing 14 as a second airfoil 32. The airfoil arrangement 26 includes a linear track drive device 34 that is configured to drive the first airfoil 30 relative to the second airfoil 32 between a retracted position (FIG. 3) and an extended position (FIG. 4).

The track drive device 34 includes a track member 36 extending in a longitudinal direction. The track member 36 comprises a rack member 38 having a plurality of teeth 40. The track member 36 is mechanically coupled to the first airfoil 30 through a kinetic linkage 42.

The track drive device 34 also includes a plurality of support members 44 that support the track member 36. The support members 44 may be configured as rollers 45 that are preferably arranged above and below the track member 36.

Figure 5:
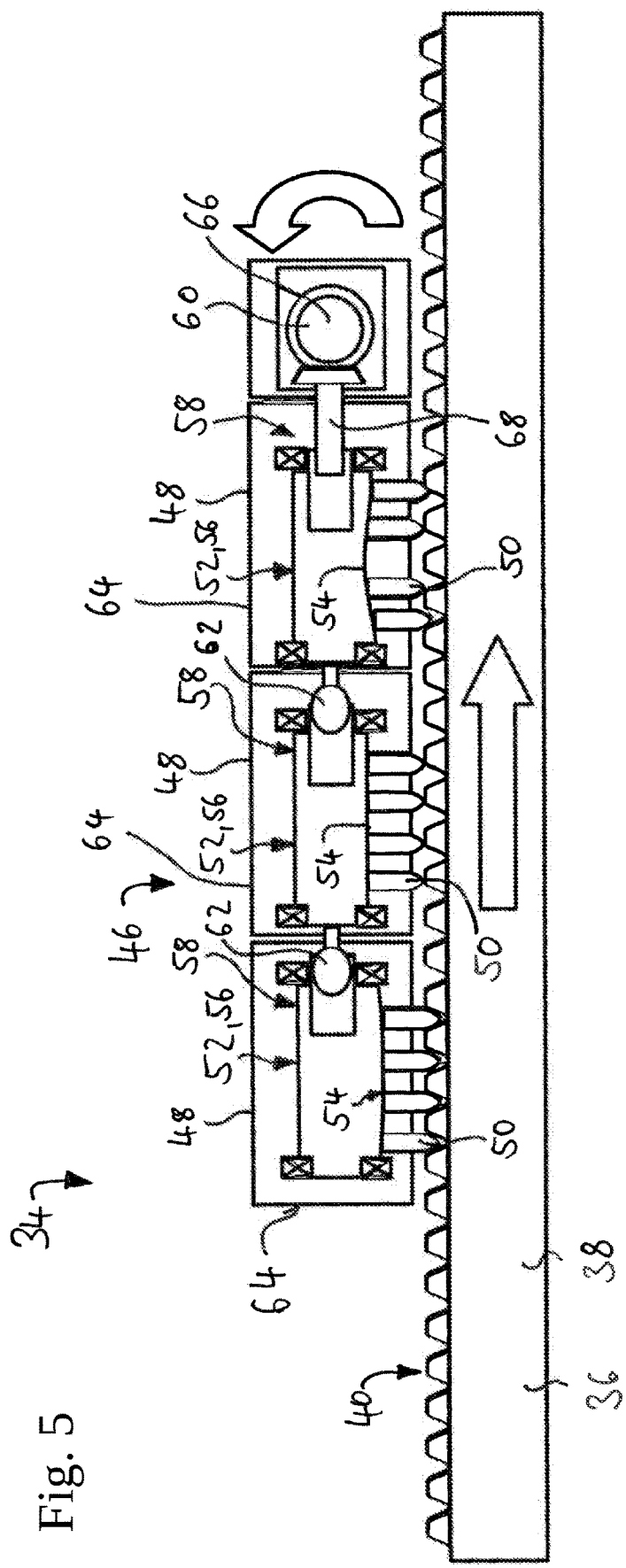
FIG. 5 depicts an embodiment of a track drive device.

Referring now to FIG. 3 to FIG. 5, the track drive device 34 includes a drive device 46 for driving the track member 36. The drive device 46 includes a plurality of drive units 48, e.g., three drive units 48. The drive units 48 are arranged along a curved path defined by the track member 36.

As depicted more closely in FIG. 5, each drive unit 48 includes a plurality of engaging members 50. The engaging members 50 are arranged so that they can mesh with the track member 36, when the engaging members 50 are in their respective fully engaged position.

Furthermore, each drive unit 48 has a cam member 52 that is rotatably supported. The cam member 52 has a control cam portion 54 that is formed so that upon rotation of the cam member 52, the engaging members 50 are sequentially moved between their respective fully engaged and fully disengaged positions. The cam member 52 may be configured as a cam shaft 56.

Adjacent cam members 52 can be configured such that adjacent drive units 48 can be arranged with an angle relative to each other. The cam members 52 are configured such that they can be articulated, in this configuration.

The cam member 52 has an input portion 58. The input portion 58 can be mechanically coupled to a mechanical drivetrain 60 or an adjacent drive unit 48. The input portion 58 is preferably formed as a hollowed out portion in which the driving component can be inserted.

The cam member 52 has an output portion 62. The output portion 62 can be mechanically coupled to another cam member 52 of another adjacent drive unit 48. The output portion 62 is preferably formed as an ellipsoidal portion that can be inserted into the input portion 58.

Both the input portion 58 and the output portion 62 may have corresponding meshing teeth.

Each drive unit 48 may have a housing 64 which supports the cam member 52 and the engaging members 50.

For a detailed description of the function the track drive device 34 and the cam member 52 reference is made to German patent application No. 1020211101487.5 filed Jan. 25, 2021, specifically FIG. 3 to FIG. 10 and the associated description on pages 7 to 11, the disclosure of which is hereby incorporated by reference.

Figure 6:
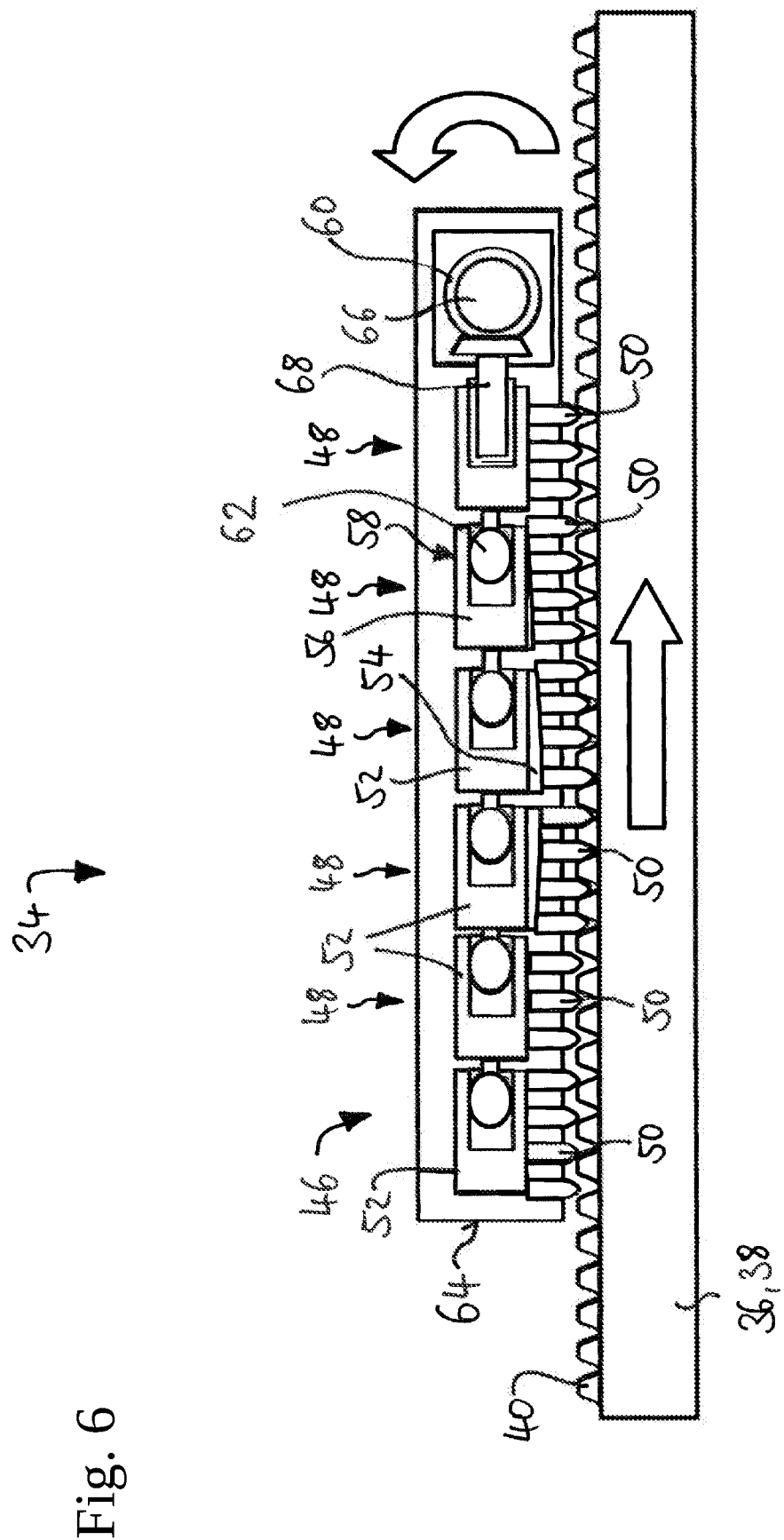
FIG. 6 depicts another embodiment of a track device.

Referring to FIG. 6, another embodiment of a track drive device 34 is depicted. It will only be described insofar as it differs from the previously described embodiment.

The track device 34 includes a plurality of drive units 48, e.g., six drive units 48. In this embodiment, all drive units 48 are supported by a single housing 64. The housing 64 in this case is configured in a curved manner, so as to follow the path defined by the track member 36.

Figure 7:
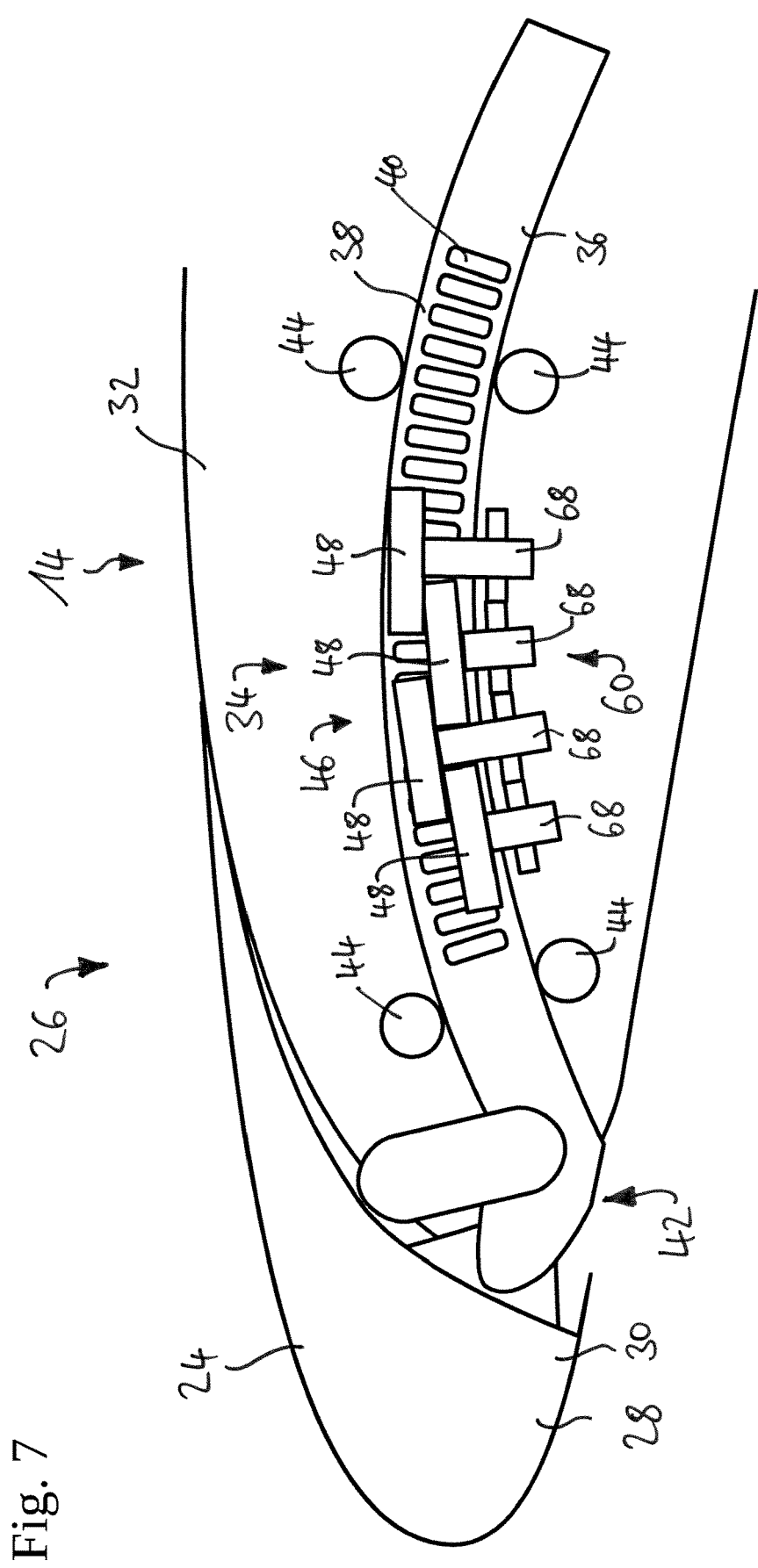
FIG. 7 depicts another embodiment of an airfoil arrangement.

Referring to FIG. 7, another embodiment of an airfoil arrangement 26 is shown. It will only be described insofar as it differs from the previously described embodiment.

The track device 34 has again a plurality of drive units 48, e.g., four drive units 48. In this embodiment, each drive unit 48 is individually coupled to the drivetrain 60. The drive units 48 not only follow the path defined by the track member 36 but also are arranged in the upper and lower halves of the track member 36.

Figure 8:
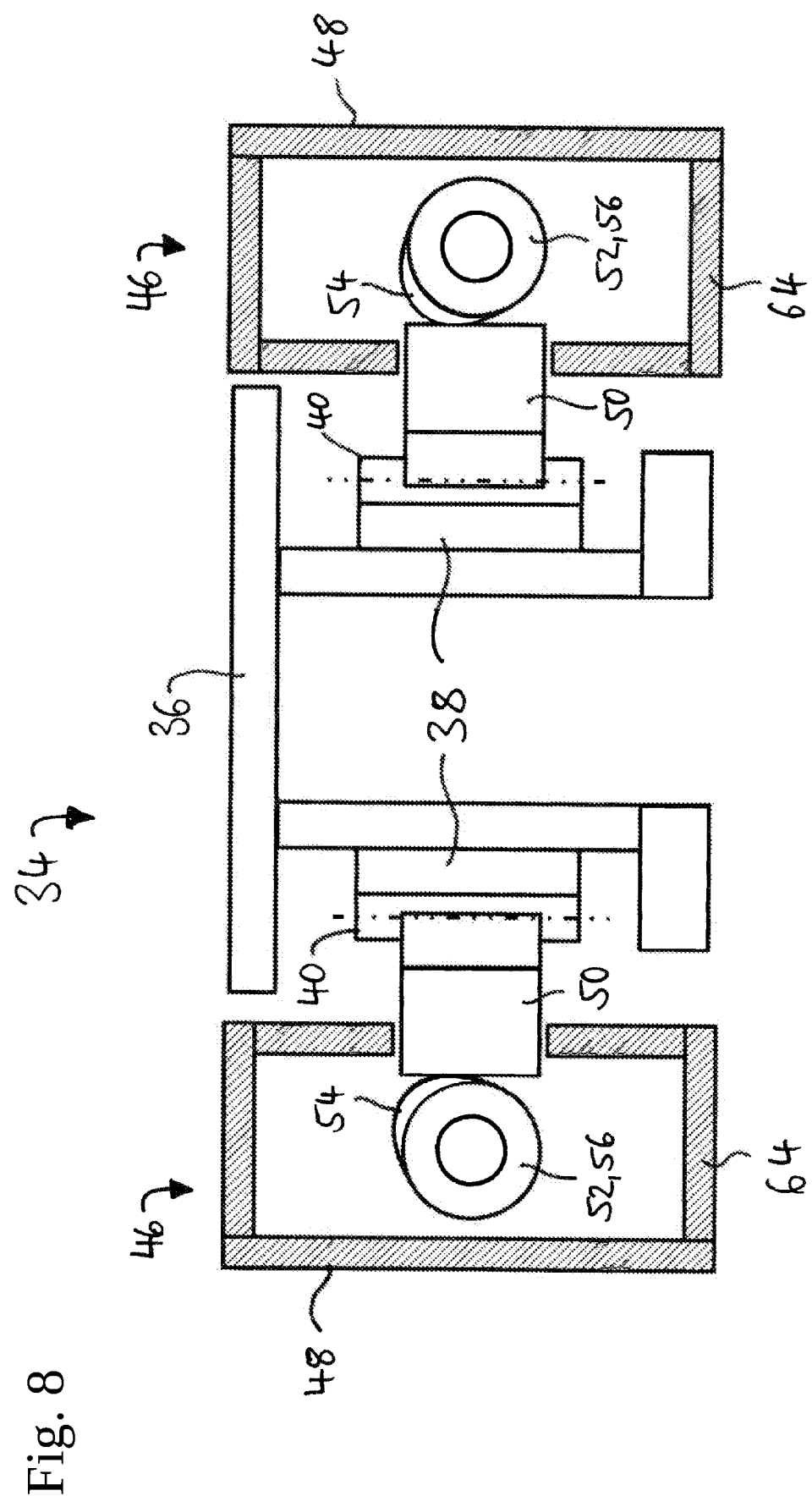
FIG. 8 to FIG. 12 depict different arrangements of track drive devices.
Figure 9:
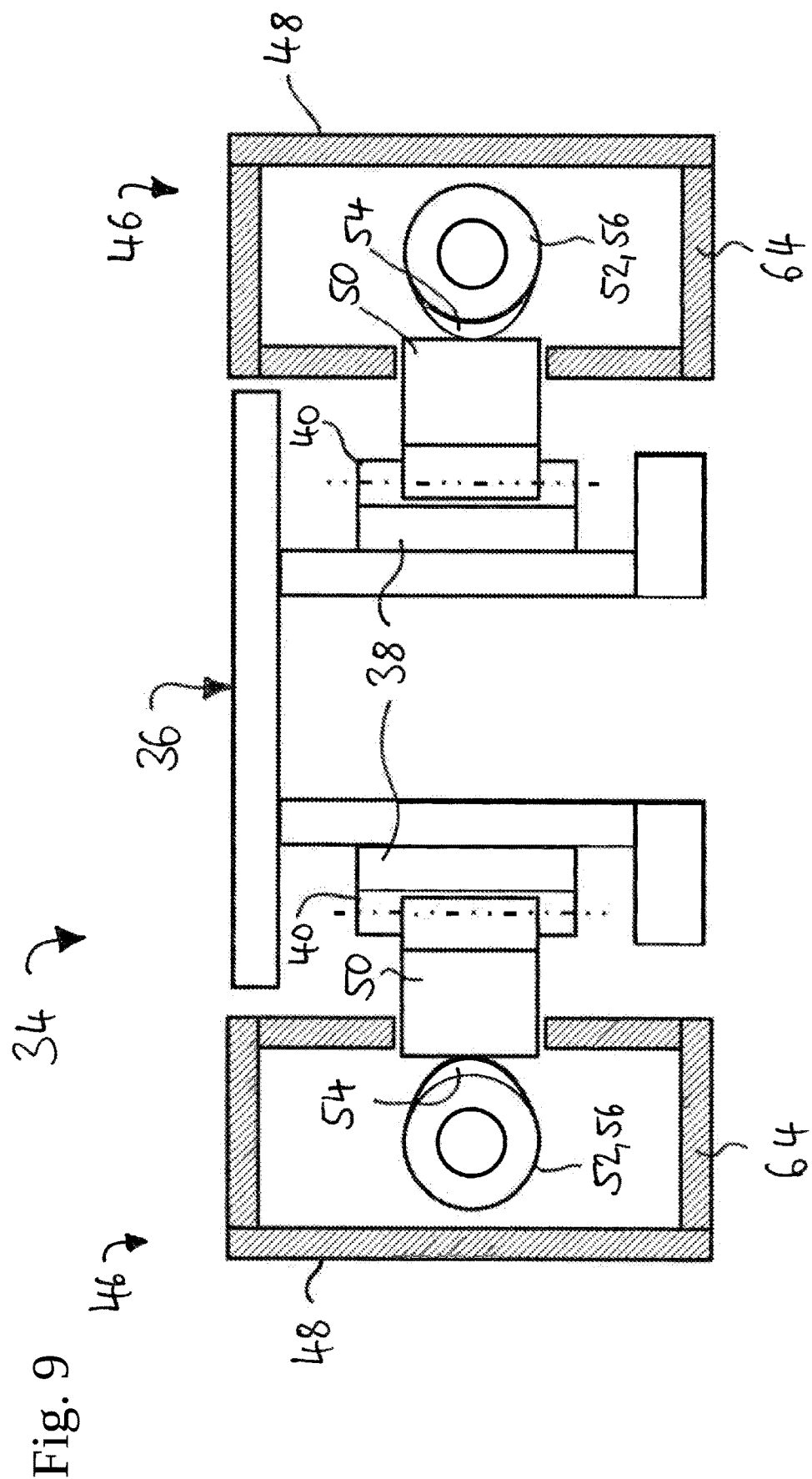

FIG. 8 and FIG. 9 schematically depict a configuration of the track drive device 34 when viewed from the leading edge. The drive units 48 are arranged on opposite sides of the track member 36 that has two rack members 38 attached to it. Upon rotation of the cam member 52 the engaging members 50 move in the same direction, e.g., away from the track member 36 towards disengagement.

Figure 10:
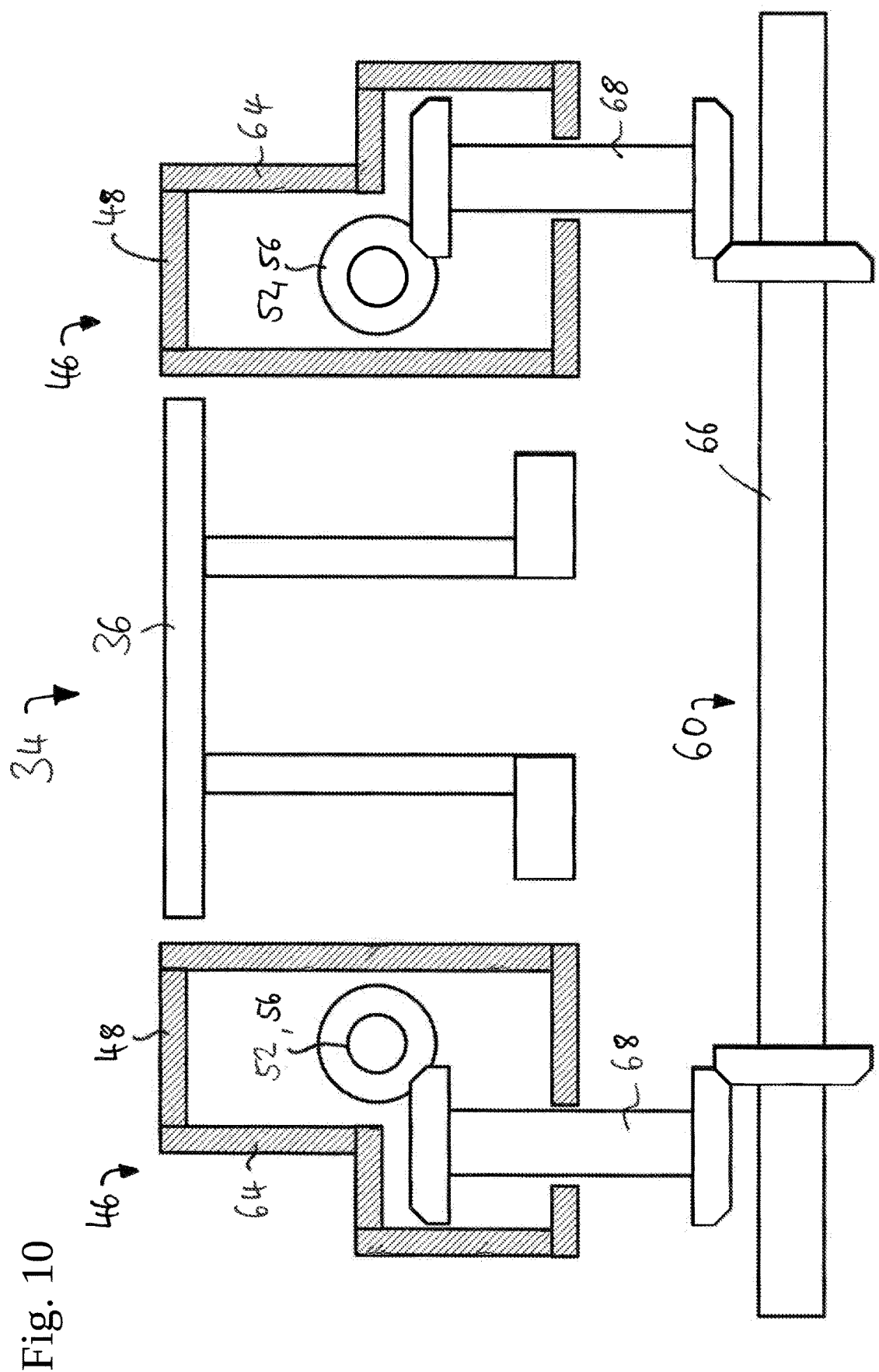

FIG. 10 schematically depicts a configuration of the drivetrain 60. A main shaft 66 extends along the inboard-outboard direction and is driven in a manner known per se. Transmission shafts 68 are driven by the main shaft 66 and connect to the drive units 48 as previously described.

Figure 11:
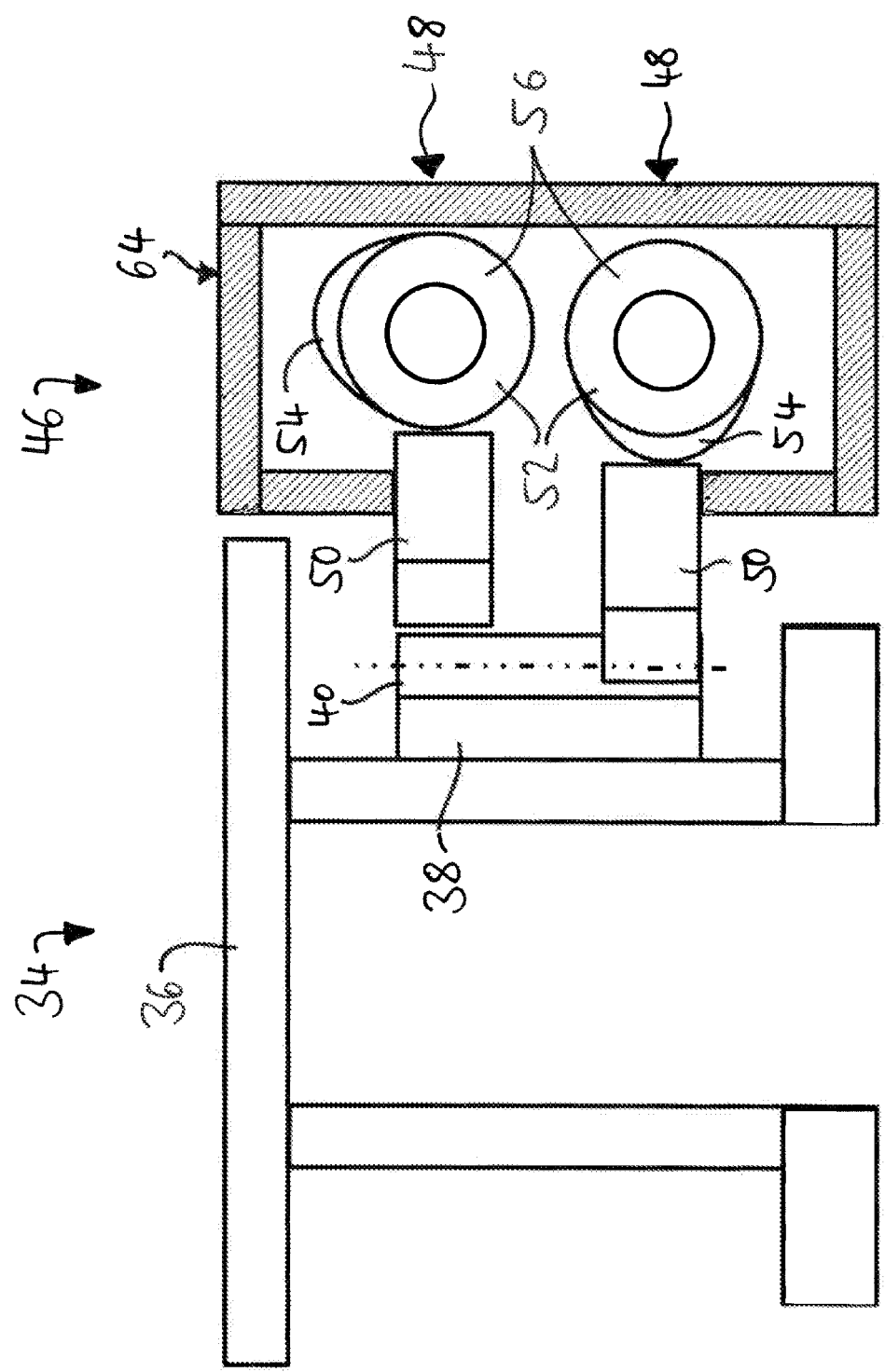

FIG. 11 schematically depicts another configuration of the track drive device 34. In this configuration the drive units 48 are stacked in the up-down direction and covered by a single housing 64. The cam members 52 of the drive units 48 are rotated relative to each other by a predetermined fixed phase angle, e.g., a quarter turn, such that the engaging members 50 move differently.

Figure 12:
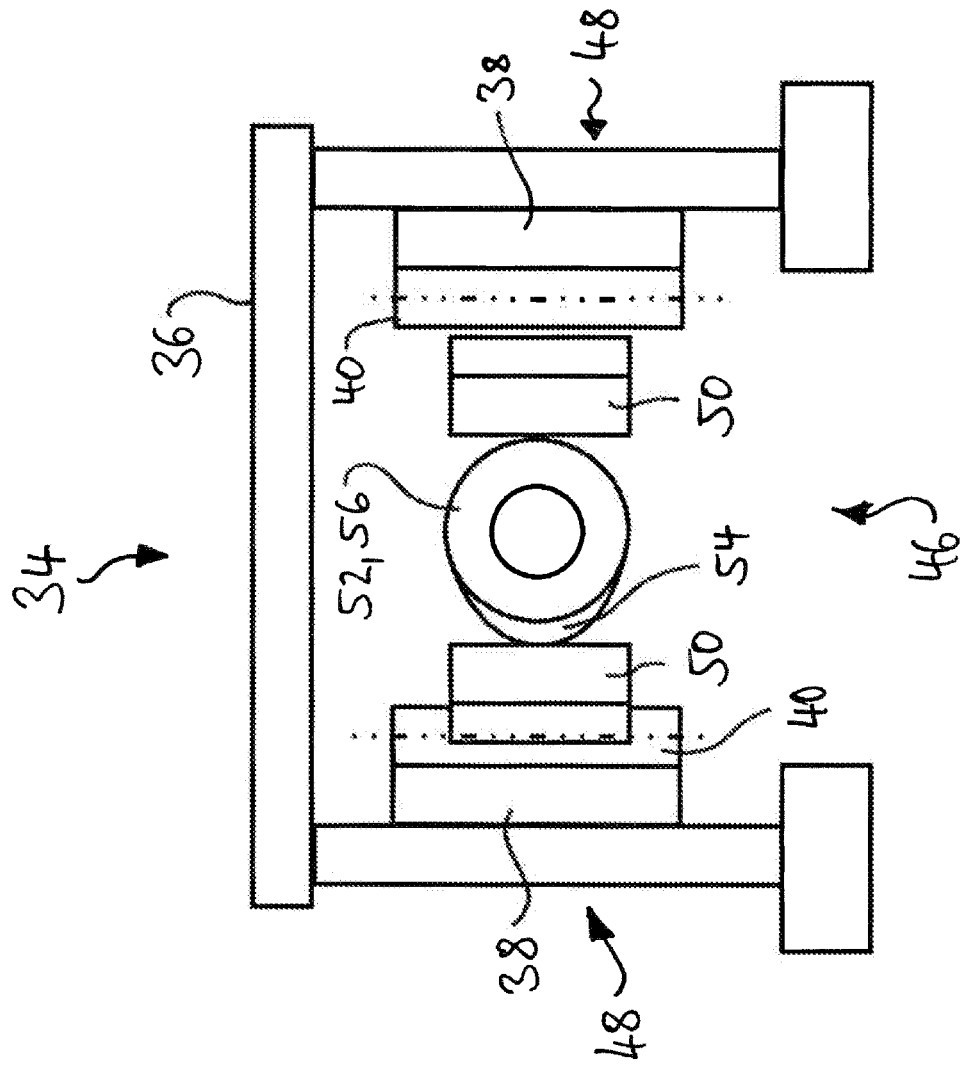
Figure 13:
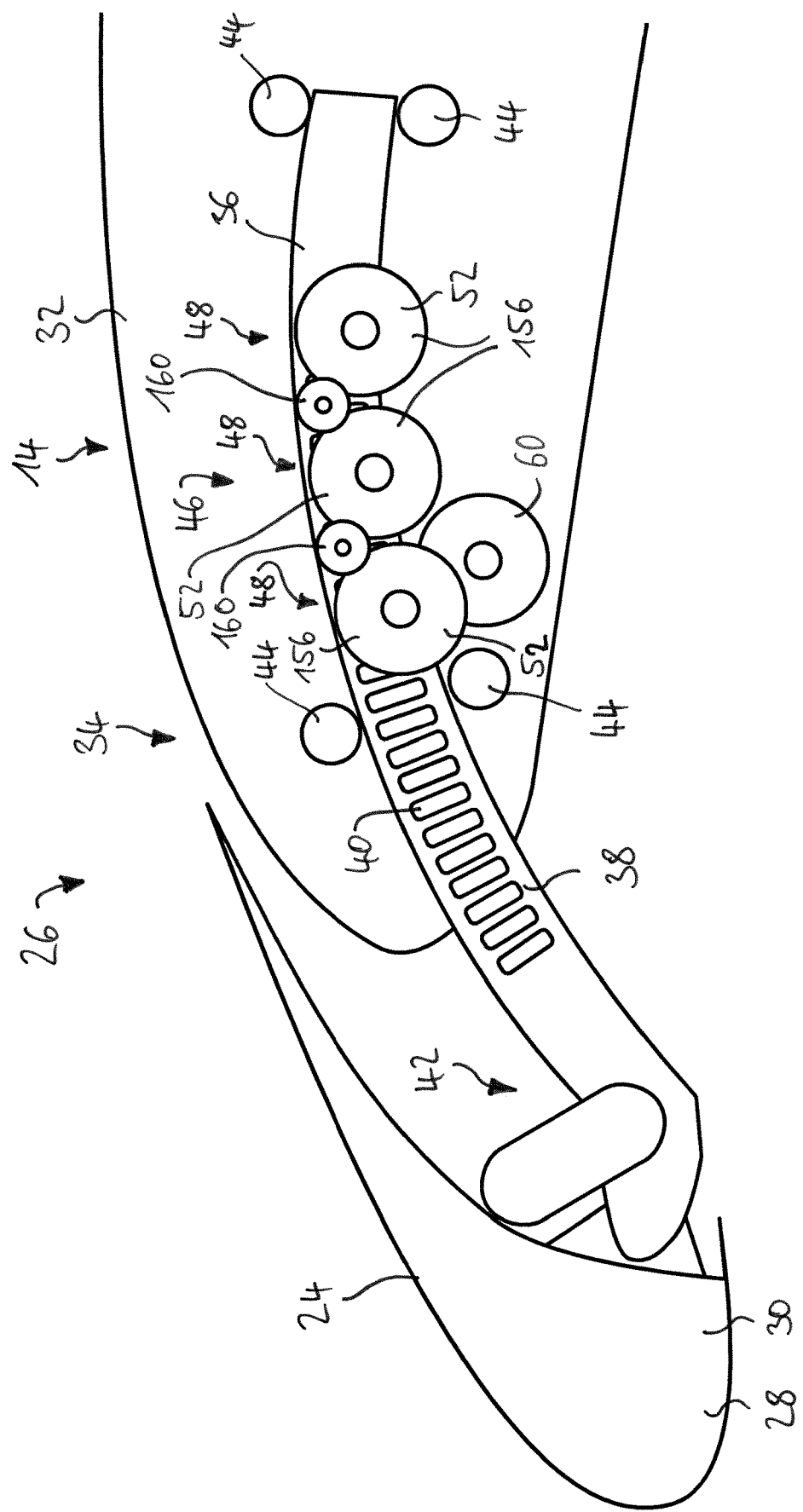
FIG. 13 depicts another embodiment of an airfoil arrangement.

FIG. 12 schematically depicts another configuration of the track drive device 34. In this configuration, the drive units 48 have engaging members 50 arranged on opposite sides within the track member 36 that are drive by a single cam member 52. As a result, the phase angle of the engaging members 50 of one side relative to the opposite side is half a turn of the cam member 52.

Referring to FIG. 13 to FIGS. 15a and 15b, another embodiment of an airfoil arrangement 26 is depicted. The airfoil arrangement 26 includes a slat 28 as a first airfoil 30 and a wing box or a leading edge member of the wing 14 as a second airfoil 32. The airfoil arrangement 26 includes a linear track drive device 34 that is configured to drive the first airfoil 30 relative to the second airfoil 32 between a retracted position and an extended position.

The track drive device 34 includes a track member 36 extending in a longitudinal direction. The track member 36 comprises a rack member 38 having a plurality of teeth 40. The track member 36 is mechanically coupled to the first airfoil 30 through a kinetic linkage 42.

The track drive device 34 also includes a plurality of support members 44 that support the track member 36. The support members 44 may be configured as rollers 45 that are preferably arranged above and below the track member 36.

The track drive device 34 includes a drive device 46 for driving the track member 36. The drive device 46 includes a plurality of drive units 48, e.g., three drive units 48. The drive units 48 are arranged along a curved path defined by the track member 36.

Each drive unit 48 includes a plurality of engaging members 50. The engaging members 50 are arranged so that they can mesh with the track member 36, when the engaging members 50 are in their respective fully engaged position.

Furthermore, each drive unit 48 has a cam member 52 that is rotatably supported. The cam member 52 has a control cam portion 54 that is formed so that upon rotation of the cam member 52, the engaging members 50 are sequentially moved between their respective fully engaged and fully disengaged positions. The cam member 52 may be configured as a gearwheel 156. The cam portion 54 is arranged on one or both sides of the cam gearwheel 156.

Figure 14:
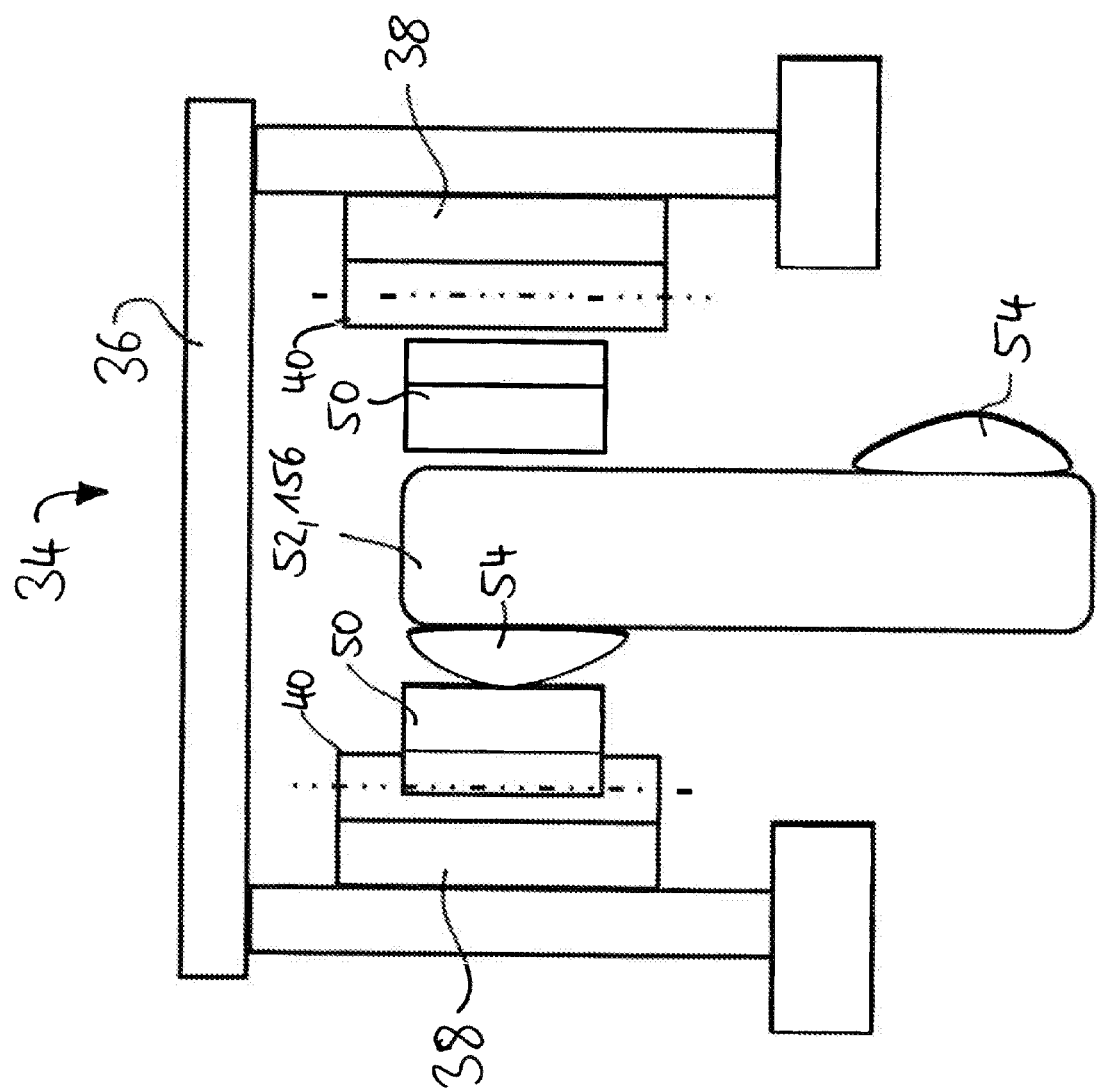
FIG. 14 depicts a detailed view of a track drive device.
Figure 15B:
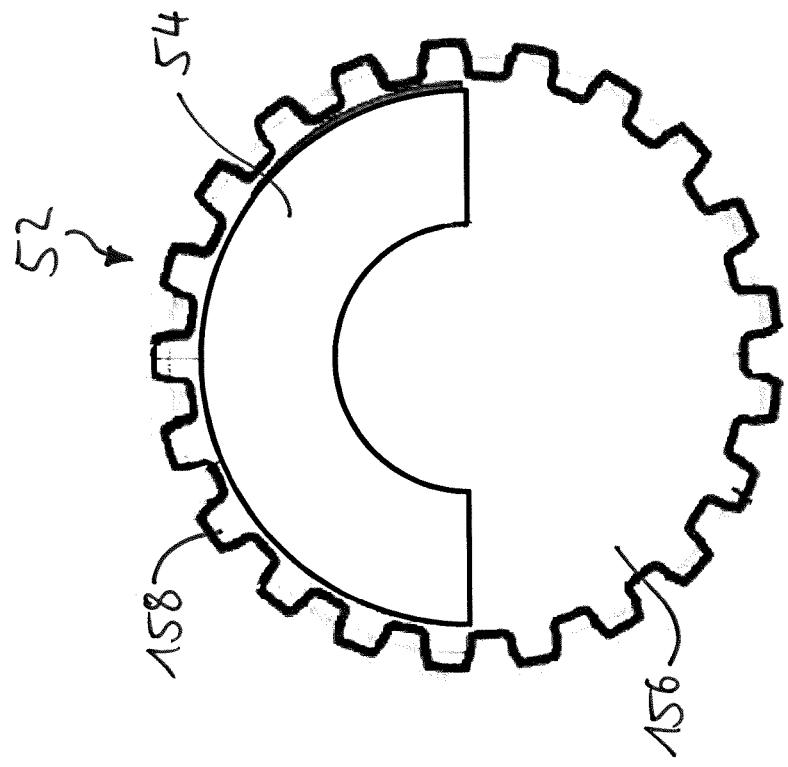
FIGS. 15a and 15b depict a detailed view of a rotatable cam member.
Figure 15A:
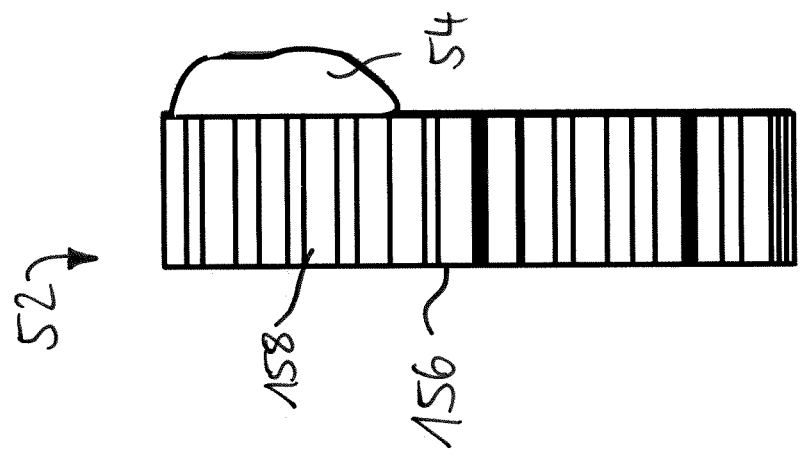

In a variant, the cam member 52 is arranged below the track member 36 and the cam portions 54 on opposite sides of the cam member 52 drive the engaging members 50 (FIG. 14).

The cam member 52 has toothed portion 158. The toothed portion 158 can be mechanically coupled to a mechanical drivetrain 60 or an adjacent drive unit 48 through an intermediate gear 160. Specifically, the gearwheels 156 mesh with the intermediate gears 160, one of which is driven by the drivetrain 60.

With the track drive devices 34 described herein, multiple load-paths and thus failsafe capabilities can be implemented for moving airfoils relative to each other. The measures can achieve up to zero backlash, a larger gear reduction from the input to the output compared to known mechanisms, the ability to self-lock, and better load transfer as well as reduced wear due to larger pressure transmission surfaces.

In order to provide a track drive device for an aircraft that has zero backlash, a large gear reduction, the ability to self-lock, and a better load transfer and reduced wear, the invention proposes that the track drive device (34) drives a track member (36) through a drive device (46) that has at least one drive unit (48) that is arranged adjacent to the track member. Each drive unit (48) comprises a plurality of engaging members (50) that are driven by a cam shaft (56) or a cam gear such that the engaging members (50) are sequentially shifted in a wave-like pattern which results in the track member (36) being moved in a linear manner relative to the drive device (46) along a longitudinal direction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 aircraft
12 fuselage
14 wing
16 turbine engine
18 horizontal tail plane (HTP)
20 vertical tail plane (VTP)
22 control surface
24 high-lift device
26 airfoil arrangement
28 slat
30 first airfoil
32 second airfoil
34 track drive device
36 track member
38 rack member
40 teeth
42 kinetic linkage
44 support member
45 roller
46 drive device
48 drive unit
50 engaging members
52 cam member
54 cam portion
56 cam shaft
58 input portion
60 drivetrain
62 output portion
64 housing
66 main shaft
68 transmission shaft
156 cam gear
158 toothed portion
160 intermediate gear

The invention claimed is:

1. A track drive device configured to drive a first airfoil relative to a second airfoil between a fully extended and fully retracted position, the track drive device comprising:
 a track member that extends in a longitudinal direction and includes a toothed rack member,
 a plurality of support members that are configured to support the track member in a movable manner, and
 a drive device configured to drive the track member between the fully extended and fully retracted positions, the drive device having at least one drive unit that is arranged adjacent to the track member,
 wherein each drive unit comprises a plurality of engaging members being supported so as to be movable between a fully engaged position, in which the respective engaging member fully engages the toothed rack member, and a fully disengaged position, in which the respective engaging member is fully disengaged from the toothed rack member, and
 a rotatable cam member having a control cam portion, the control cam portion being configured so as to, upon rotation of the rotatable cam member, sequentially move the engaging members linearly in a direction orthogonal to a direction of motion of the track member between the fully engaged and fully disengaged positions so as to cause a linear motion of the track member relative to the drive device along the longitudinal direction, wherein each of the plurality of engaging members is aligned parallel to the direction of motion of the engaging members when moving between the fully engaged and fully disengaged positions.

2. The track drive device according to claim 1, wherein the drive device includes at least two drive units that are configured such that there is at least one engaging member in the fully engaged position in one of the at least two drive units.

3. The track drive device according to claim 2, wherein the engaging members are arranged so as to form at least a first engaging member set and a second engaging member set of engaging members and the control cam portion is configured so as to, upon rotation of the rotatable cam member, sequentially move engaging members of each engaging member set, wherein a first drive unit comprises the first engaging member set and a second drive unit comprises the second engaging member set.

4. The track drive device according to claim 3, wherein, when the at least two drive units are arranged on the same side of the track member, the control cam portion is configured such that the engaging members of each engaging member set closest to each other measured along the longitudinal direction are at least one of at a different position between the fully engaged and fully disengaged positions or move in opposite directions.

5. The track drive device according to claim 3, wherein, when the at least two drive units are arranged on opposing sides of the track member, the control cam portion is configured such that the engaging members of each engaging member set closest to each other measured along the longitudinal direction are at least one of at the same position between the fully engaged and fully retracted positions or move together towards or away from the track member.

6. The track drive device according to claim 2, wherein the drive units are arranged outside or inside of a channel defined by the track member.

7. The track drive device according to claim 1, wherein the drive device includes at least two drive units that are arranged at least one of adjacent to each other along the longitudinal direction, or offset from each other in a direction orthogonal to the longitudinal direction.

8. The track drive device according to claim 1, wherein the rotatable cam member is configured as a cam shaft and the control cam portion is disposed on a circumferential surface of the cam shaft.

9. The track drive device according to claim 1, wherein the rotatable cam member is configured as a gearwheel and the control cam portion is disposed on a lateral wheel surface.

10. The track drive device according to claim 1, wherein the drive device includes at least two drive units and the respective rotatable cam members are coupled to each other by a torque transmitting member.

11. The track drive device according to claim 1, wherein the track member comprises a toothed rack member on two opposing sides, the drive device includes at least two drive units, the drive units are arranged on the opposing sides so that each drive unit engages the toothed rack member from the side on which the respective drive unit is arranged.

12. The track drive device according to claim 1, wherein the drive device includes at least two drive units, the drive units are arranged on the same side of the track member and the drive units are arranged so that each drive unit engages the same toothed rack member from the side on which the drive units are arranged.

13. An airfoil arrangement comprising a first airfoil, a second airfoil and a track drive device according to claim 1, wherein the track member is attached to the first airfoil and the support members and the drive device are attached to the second airfoil, so that the drive device is configured to move the first airfoil between the fully extended and the fully retracted positions.

14. A wing for an aircraft comprising an airfoil arrangement according to claim 13, wherein the first airfoil is a high-lift device or a control surface and the second airfoil is a wing box or a leading edge member.

15. An aircraft comprising a wing according to claim 14.

16. An aircraft comprising an airfoil arrangement according to claim 13.

17. An aircraft comprising a track drive device according to claim 1.

18. The track drive device according to claim 1, wherein the plurality of engagement members are formed as rectangular solid members or as pin-like members.

19. The track drive device according to claim 1, wherein the plurality of engagement members have an engaging portion that is arranged to engage the toothed rack member in a planar manner, and wherein the engaging portion, when viewed in a cross-section, is shaped as a triangle or an ogive.

* * * * *